United States Patent
König

(10) Patent No.: US 6,401,702 B1
(45) Date of Patent: *Jun. 11, 2002

(54) CONTROLLED TWO-STROKE INTERNAL COMBUSTION ENGINE

(76) Inventor: Kurt König, Am Kappengrund 32, 86946 Vilgertschofen-Issing (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/304,492

(22) Filed: May 3, 1999

Related U.S. Application Data

(60) Continuation of application No. 09/023,342, filed on Feb. 13, 1998, now Pat. No. 5,934,262, which is a division of application No. 08/652,583, filed as application No. PCT/EP94/04061 on Dec. 6, 1994, now Pat. No. 5,738,050.

(30) Foreign Application Priority Data

Dec. 8, 1993 (DE) .......................................... 43 41 885

(51) Int. Cl.⁷ .............................................. F02B 23/00
(52) U.S. Cl. ...................... 123/661; 123/193.6; 123/666
(58) Field of Search ............................. 123/193.6, 661, 123/664, 666

(56) References Cited

U.S. PATENT DOCUMENTS

| | | | |
|---|---|---|---|
| 1,731,228 A | 10/1929 | Burtnett | 123/65 VB |
| 1,833,802 A | 11/1931 | Violet | 123/65 VB |
| 1,878,339 A | 9/1932 | Southern | 123/65 VB |
| 2,030,732 A | 2/1936 | Angel | 123/65 VB |
| 2,096,327 A | 10/1937 | Howard | 123/65 WA |
| 2,189,106 A | 2/1940 | Garve et al. | 123/65 VB |
| 2,466,181 A | 4/1949 | Myrick | 123/65 VB |
| 4,162,661 A | 7/1979 | Nakanishi et al. | 123/661 |
| 4,324,214 A | 4/1982 | Garcea | 123/661 |
| 4,508,073 A * | 4/1985 | Hofbauer et al. | 123/661 |
| 4,567,863 A | 2/1986 | Fletcher | 123/307 |
| 4,693,215 A | 9/1987 | Sugiyama et al. | 123/308 |
| 4,864,979 A | 9/1989 | Eickmann | 123/65 VB |
| 4,995,349 A | 2/1991 | Tuckey | 123/65 WA |
| 5,027,757 A | 7/1991 | Pusic | 123/65 VB |
| 5,115,774 A * | 5/1992 | Nomura et al. | 123/661 |
| 5,127,379 A | 7/1992 | Kobayashi et al. | 123/661 |
| 5,195,488 A | 3/1993 | Rattigan | 123/661 |
| 5,365,902 A | 11/1994 | Hsu | 123/304 |
| 5,934,262 A * | 8/1999 | Kong | 123/661 |

FOREIGN PATENT DOCUMENTS

| | | | |
|---|---|---|---|
| DE | 2346887 | 4/1975 | 123/65 VB |
| DE | 3600408 | 7/1987 | 123/65 VB |
| EP | 0554235 | 1/1993 | |
| WO | WO 8606789 | 11/1986 | |
| WO | WO 9100684 | 1/1991 | |

\* cited by examiner

*Primary Examiner*—John Kwon
(74) *Attorney, Agent, or Firm*—Mallinckrodt & Mallinckrodt; Robert R. Mallinckrodt

(57) ABSTRACT

A combustion chamber in a reciprocating-piston internal combustion engine having at least one inlet duct and at least one outlet duct is formed by a cylinder head and piston each having respective annular squish surfaces for acceleration of fresh gases. A mixture guide element having a recess in its top adjoins the piston crown and the inlet duct to the cylinder is arranged to cause fresh gases to flow with a circulatory movement into the combustion chamber. The configuration increases power output while reducing pollution emissions.

2 Claims, 6 Drawing Sheets

CONTROLLED TWO-STROKE INTERNAL COMBUSTION ENGINE

RELATED APPLICATIONS

Figure 1:
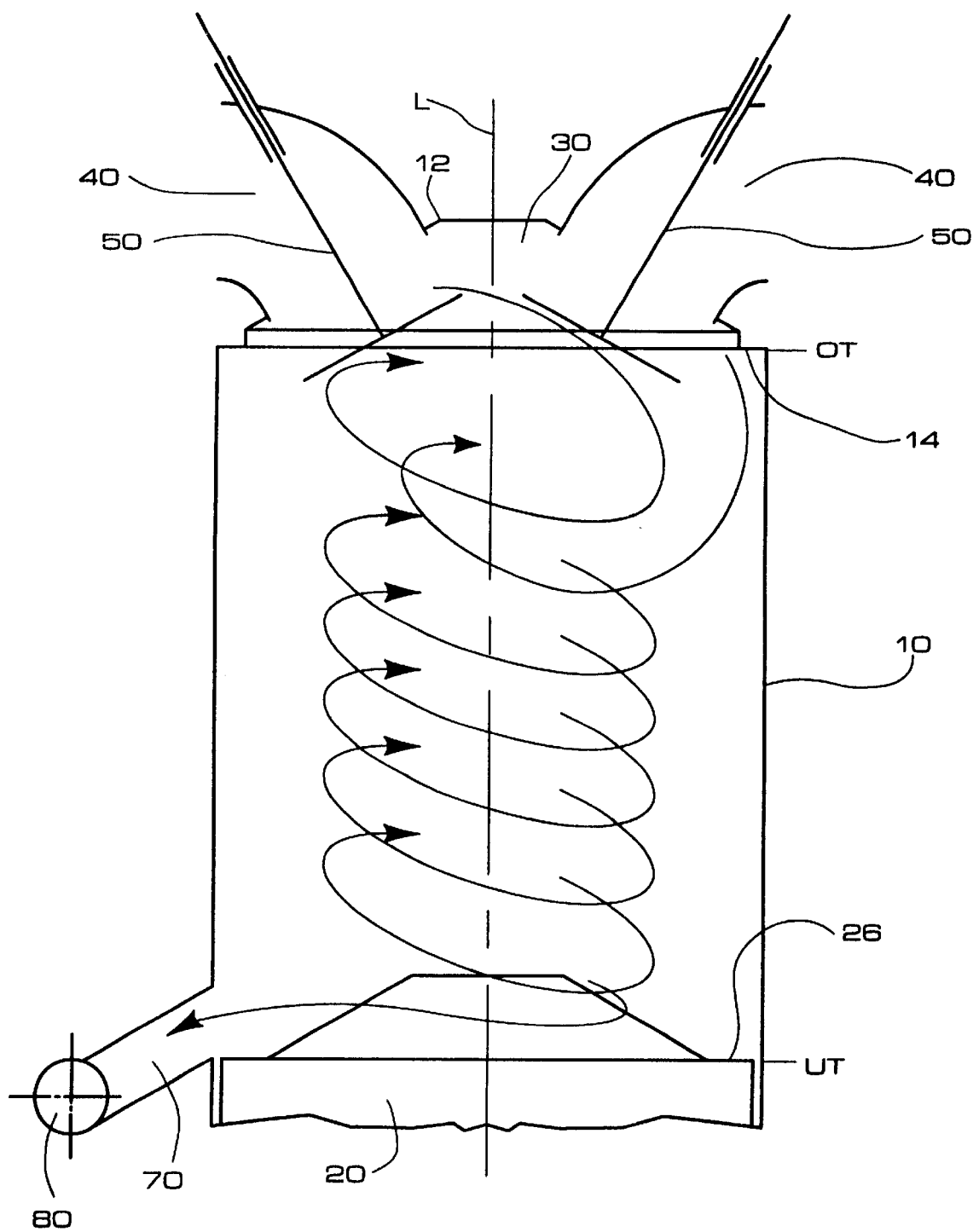

This is a continuation application of application Ser. No. 09/023,342 filed Feb. 13, 1998, now U.S. Pat. No. 5,934,262, which was a divisional application of U.S. application Ser. No. 08/652,583 having a filing date of Oct. 23, 1996 as the U.S. National Phase of PCT/EP94/04061 filed Dec. 6, 1994, now U.S. Pat. No. 5,738,050.

DESCRIPTION

The invention concerns a combustion chamber for reciprocating-piston internal combustion engines as set forth in the classifying portion of claim 1.

The requirements made in respect of reciprocating-piston internal combustion engines are a low level of pollutant emission and a low specified fuel consumption, that is to say, little fuel is to be burnt. The following conditions must be observed in order to satisfy those requirements: a high level of fresh gas acceleration, a high fresh gas speed, turbulence-free flow, a deflector surface on the piston crown, a guide element for fresh gases, a combustion chamber in the cylinder head and in the piston crown, concentration of the fresh gases in the center of the combustion chamber, a high degree of compression, and rapid combustion.

German patent specification No. 32 24 337 describes a piston with a spherical squish gap and a combustion chamber which is partially formed in the piston crown. The spherical configuration of the piston crown is to accelerate the potential flow of the fresh gases in the compression stroke, while at the same time there is a rotational flow circulating in the same direction in the direction of the cylinder axis, but in the opposite direction in relation thereto. At the top dead center point the potential flow is urged into the combustion chamber by the spherical squish surface. When that happens the particles of fuel which are disposed in the outer edge region of the potential flow are also conveyed inwardly. A rich mixture is formed in the combustion chamber at the edge of the rotational flow, and is fired by two spark electrodes. Due to the piston crown being advantageous in terms of flow configuration, the fuel particles of the potential flow are in the region of the cylinder wall and at top dead center are conveyed into the upper part of the combustion chamber by the pressure occurring in the squish surfaces. The rotational flow prevents penetration into the center of the combustion chamber. That also explains the arrangement of two spark electrodes.

The same considerations apply to British patent specification No. 1 119 298 as apply to German patent specification No. 32 24 337 as the combustion chamber, the piston crown, and the squish surfaces have the same features. In this case, at top dead center, the fresh gases are urged by way of passages to the spark electrode, and fired. The flame flashes back by way of the passages into the combustion chamber and ignites the remaining fresh gases. As the passages act as throttle means, this arrangement must be expected to involve losses in terms of pressure and power. In addition, there is a delay in regard to combustion of the whole of the fresh gases, which results in an increase in the harmful hydrocarbons in the exhaust gas.

In German patent specification No. 37 18 083 the piston crown, which is in the form of a ridge or saddle roof, does not permit an uninterrupted flow of the fresh gases. Eddy flows occur at the mutually oppositely disposed lateral trough portions, and those flows produce damaging turbulence phenomena in the central trough. Those turbulence effects are further increased by the squish flow.

U.S. Pat. No. 5,390,634 describes a combustion chamber which is disposed in the cylinder head and in the piston crown. The piston crown has an irregular portion thereon which is intended to guide the mixture and produce turbulence therein. The squish surface portions promote the eddy formation effect, like also the asymmetrical combustion chamber in the piston crown.

German patent specification No. 35 11 837 discloses a further combustion chamber in which the piston has a step configuration for which there is a corresponding cooperating contour in the cylinder chamber. The surfaces in the form of a circular ring, which are afforded by the step configuration of the piston and the cylinder chamber, serve as surfaces for defining a fresh air chamber which is provided as a buffer. An annular gap which is formed between the peripheral wall of the piston in the region of the step configuration and the corresponding inside wall of the cylinder during compression and which forms a communication from the fresh air chamber to the combustion chamber is provided as a throttle means. Therefore, the fresh gases to be compressed are retarded when they pass from the fresh air chamber into the combustion chamber.

German laid-open application (DE-OS) No. 31 07 836 discloses a piston with an annular trough 12 for collecting the fresh gases and for producing a rotational movement of those gases about the axis of the annular configuration. In this case also there is no acceleration of the fresh gases.

Patent specification No. 91 636 of the German Democratic Republic discloses guiding the fresh gases in a predetermined direction through guide passages which are comparable to guide vanes of turbines.

The Abstract of Japanese patent application No. 07 019 051 shows how fresh gases are urged inwardly between a piston and a cylinder head and are passed by a guide element into the compression chamber which is disposed in the cylinder head.

Finally the Abstract of Japanese patent application No. 61-175225 discloses a combustion chamber whose center line is arranged in displaced relationship relative to the axis of the combustion chamber in the piston crown. In other words, combustion chamber portions are arranged in mutually displaced relationship. The displaced relationship and the squish gap cause turbulence phenomena to be produced in the fresh gases in the compression chamber. There is no mixture guide element. Furthermore, the fresh gases are not guided in a circular configuration.

The object of the present invention is to satisfy the conditions set forth in the opening part of this specification and to provide a combustion chamber which, while saving fuel, has a lower level of pollution emission in relation to the fuel consumption.

The foregoing object is attained by the features of Claim 1. Advantageous configurations are set forth inter alia in appendant Claims 2 and 3.

In the induction stroke, the fresh gases flow tangentially into the combustion chamber through one or more inlet valves. The fresh gas temperature is reduced at the cooled cylinder wall, due to the circulatory movement, whereby better filling is achieved and a higher level of compression is possible. This results in a higher power output with a reduction in specific fuel consumption.

In the compression stroke the circulatory movement of the fresh gases is maintained by a mixture guide element on the piston crown, in which respect a circular squish surface which serves here as an accumulation or deflector surface provides for the necessary upward movement. By virtue of the squish gap at top dead center, the fresh gases are urged in a circulatory mode inwardly, they collect at the center of the combustion chamber trough, and are fired by a spark electrode arranged on the longitudinal axis of the cylinder. Due to the central arrangement of the spark electrode, the flame front can spread rapidly and uniformly in all directions, which affords a reduction in the HC-proportion in the exhaust gas.

When burning diesel oil, an injection nozzle can be provided in place of the spark electrode on the longitudinal axis of the cylinder. As injection of the diesel oil takes place primarily into the combustion chamber trough in the piston crown, in which case the fuel is deposited in the form of a thin film on the wall surface of the trough, combustion is gentler and noise emission is lower.

In operation as a lean burn engine there are to be provided at least two inlet ducts each having a respective injection valve, in which case in the induction stroke a lean mixture flows into the cylinder and a rich mixture is excluded from bottom dead center to inlet. The injection valves are operated in succession. Upon compression, due to the way in which the fresh gas is guided and due to the squish gap, the rich mixture is concentrated in a circulatory manner in the combustion chamber trough of the piston crown, and fired.

Figure 2A:
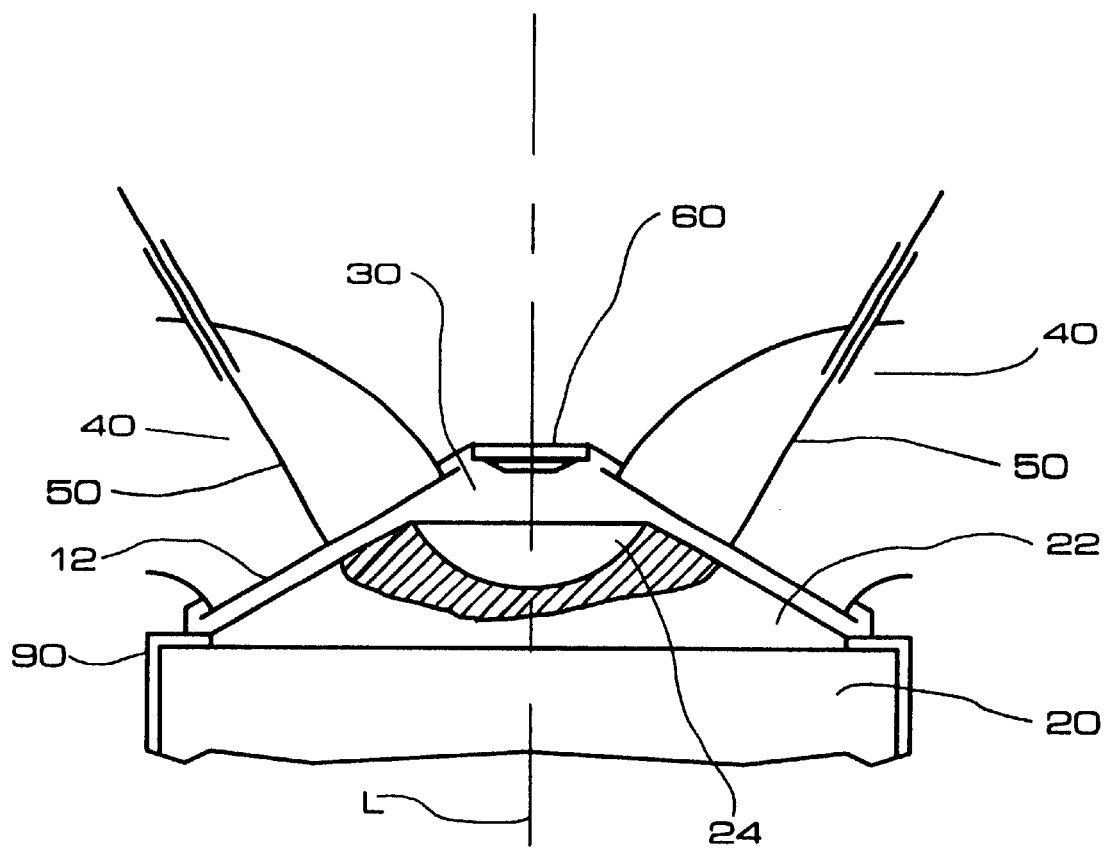
Figure 2B:
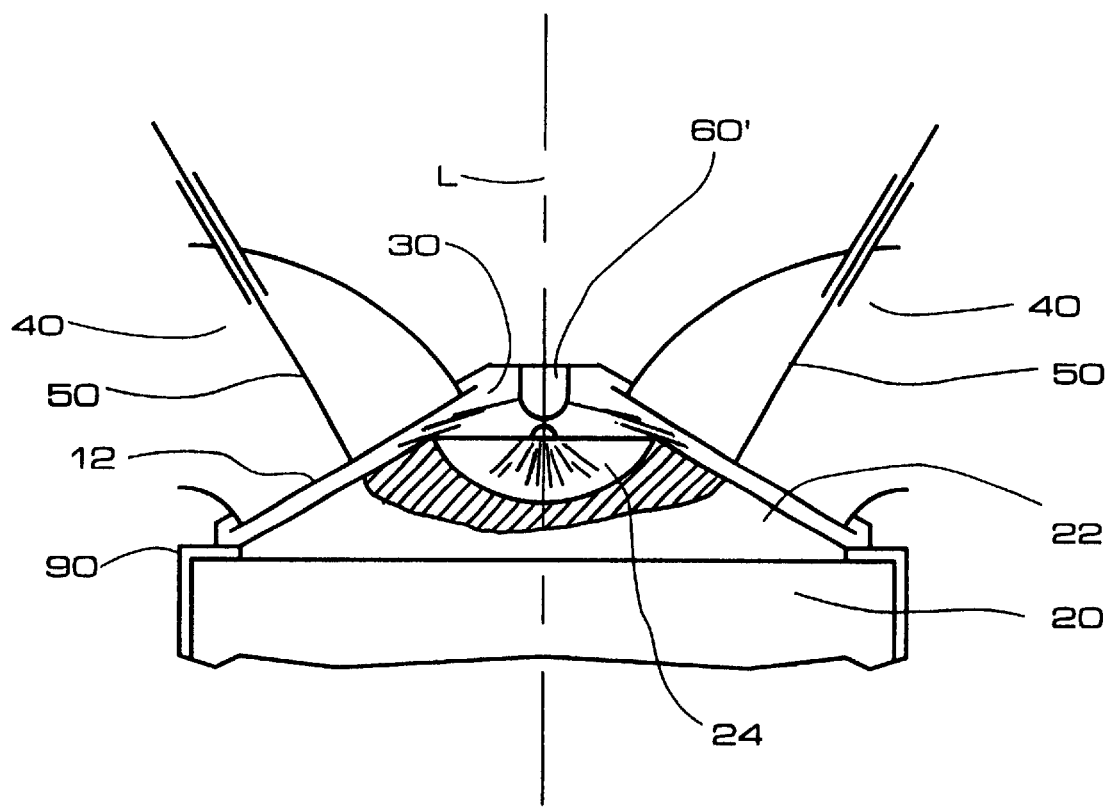
Figure 3:
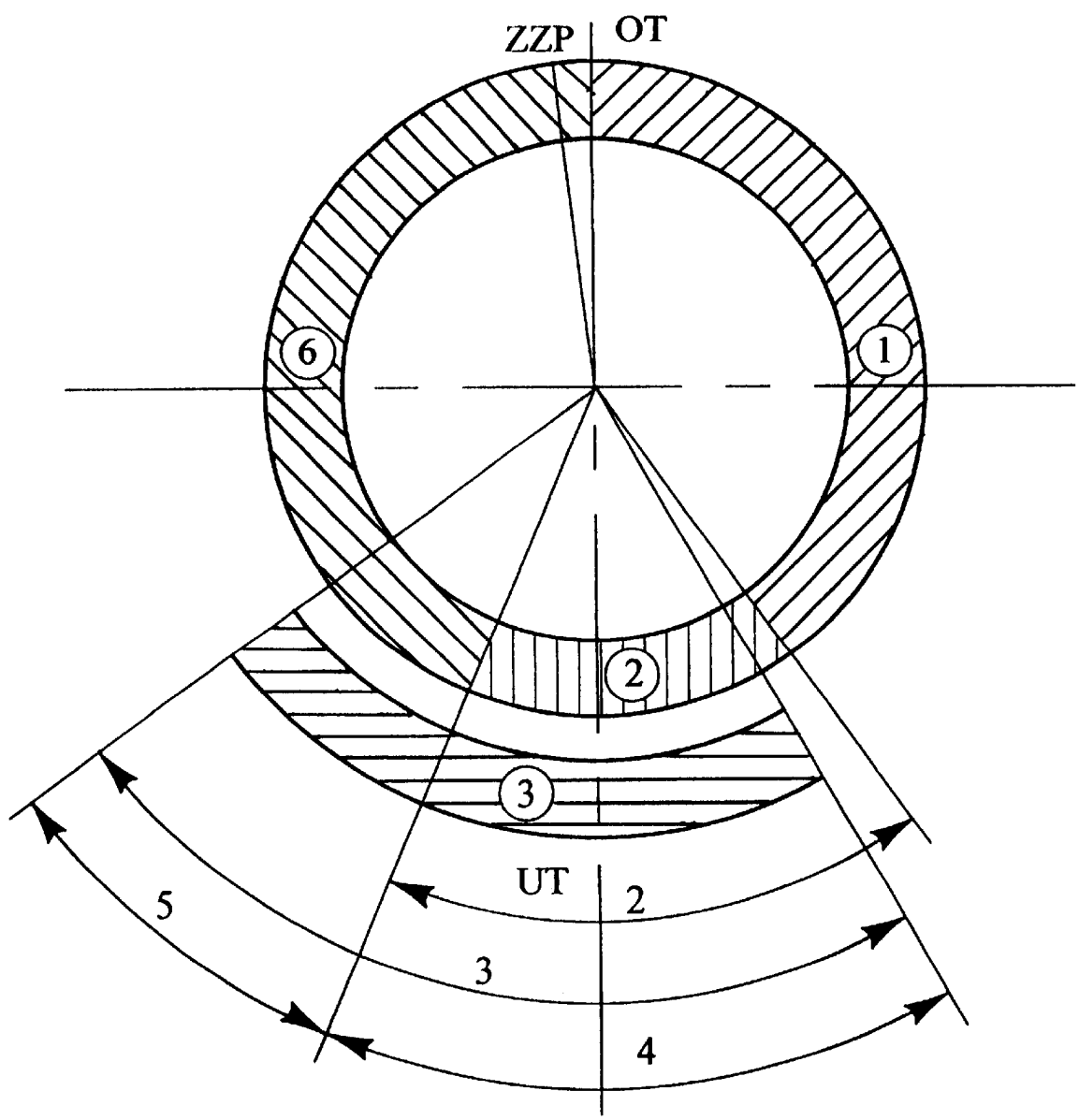
Figure 4:
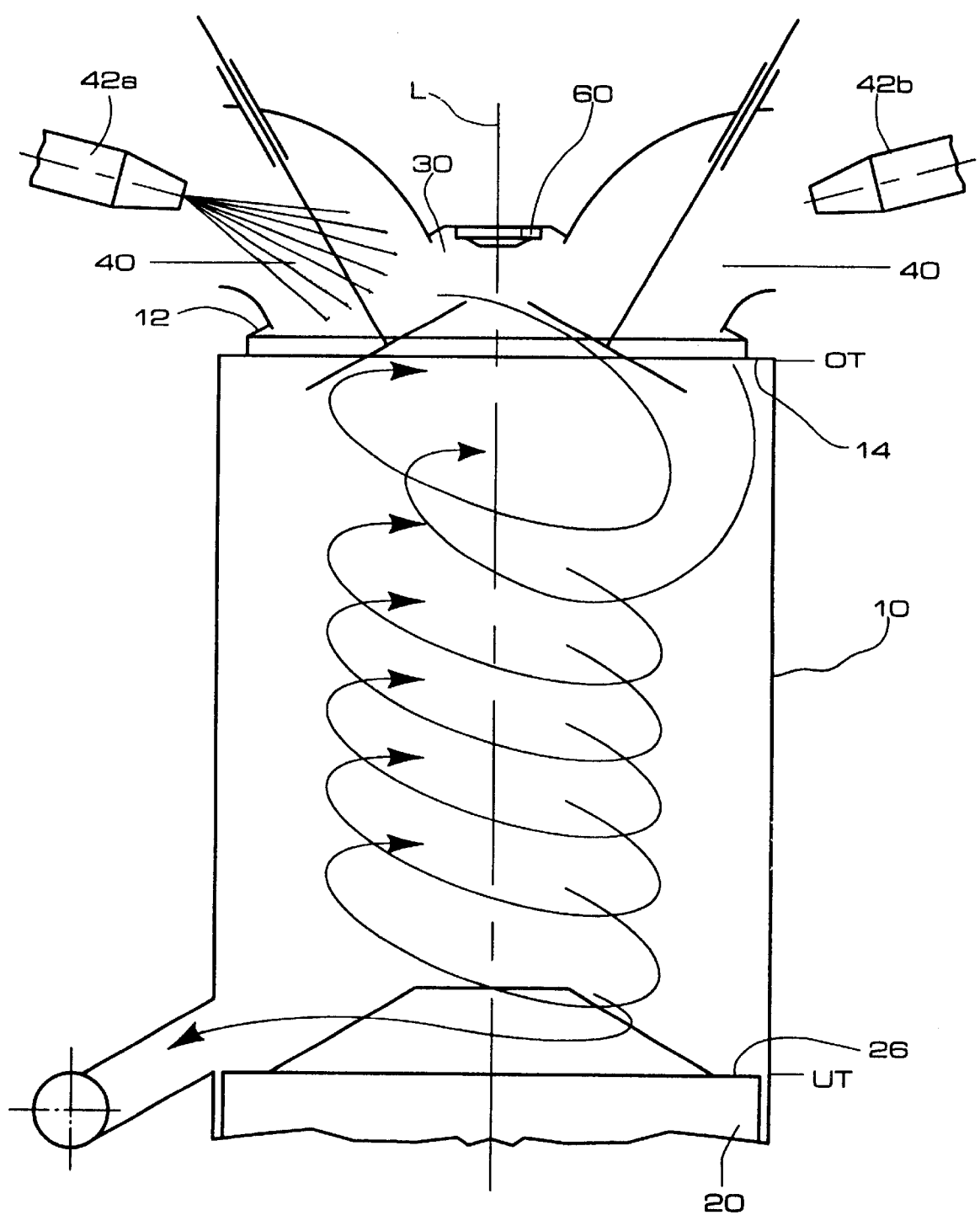
Figure 5:
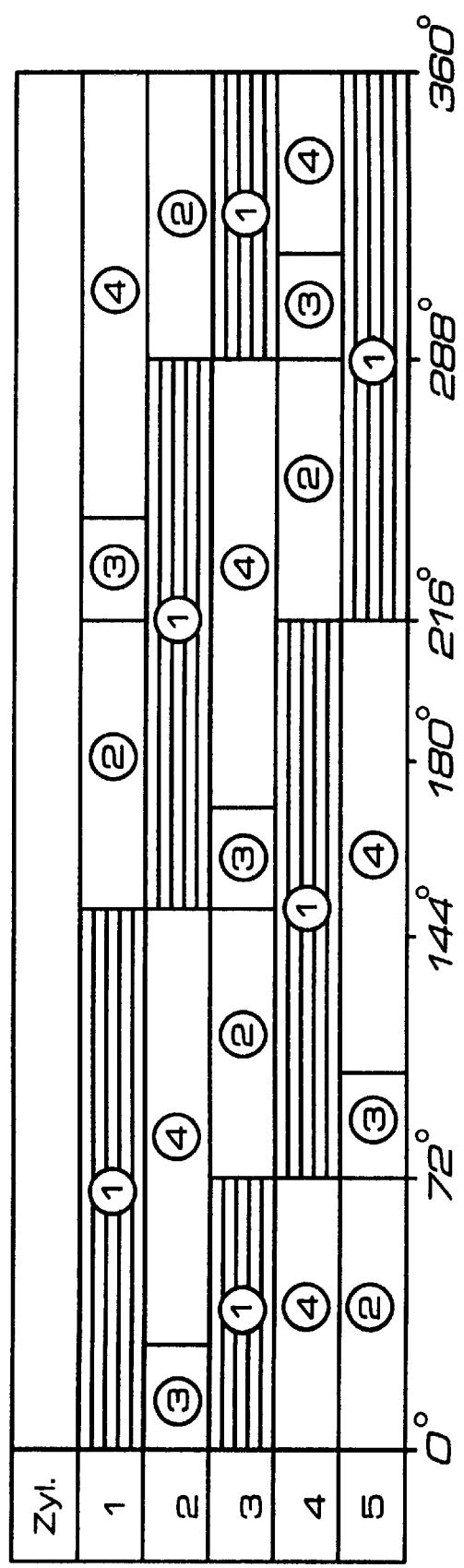

Advantageous configurations and embodiments are described hereinafter with reference to the drawings in which:

FIG. 1 is a diagrammatic view in longitudinal section through a cylinder of an internal combustion engine according to the invention, FIGS. 2a and 2b are diagrammatic partial views in longitudinal section through the combustion chamber of FIG. 1, FIG. 3 shows a control diagram for the internal combustion engine according to the invention, FIG. 4 shows a further embodiment of the internal combustion engine according to the invention, and FIG. 5 shows a working diagram for a five-cylinder two-stroke in-line engine.

In FIG. 1, reference numeral 10 denotes a cylinder and reference numeral 20 denotes a piston which can reciprocate from a bottom dead center position (=UT) to a top dead center position (=OT). Two inlet ducts 40 open on both sides of a longitudinal axis L of the cylinder 10 into the combustion chamber 30 of the cylinder head 12, the combustion chamber being of a frustoconical configuration. In this case the inlet ducts 40 are so arranged that the fresh mixture issuing therefrom can pass into the cylinder 10 with a circling motion along the wall of the cylinder, as is illustrated by appropriate arrows in FIG. 1. The two inlet ducts 40 can be opened and closed by means of inlet valves 50. In this case the two inlet valves 50 are so designed that upon opening of the respective inlet duct 40 they project into the combustion chamber 30, as illustrated in FIG. 1. The two valves 50 can be pre-loaded into their closed position by means of a spring (not shown). As can be seen from FIG. 2a, a sparking plug 60 can be arranged in the center of the frustoconical combustion chamber 30 in such a way that it sits on the longitudinal axis L of the cylinder 10. Alternatively, instead of the sparking plug 60, there may be provided an injection nozzle 60', in particular a multi-hole nozzle, as can be seen from FIG. 2b. Referring to FIG. 1, disposed beneath the inlet ducts 40 is the exhaust duct 70 which can be opened and closed by way of a controllable regulating element, such as for example a valve 80. As can be seen from FIG. 1 the exhaust valve 80 is arranged at a certain spacing relative to the mouth opening region of the exhaust duct 70 into the cylinder 10. That makes it possible to avoid thermal overloading of the exhaust valve 80. As can also be seen from FIG. 1 the exhaust duct 70 is arranged relative to the two inlet ducts 40 in such a way that scavenging of the cylinder 10 is effected by means of uniflow scavenging. Both the exhaust valve 80 and also the two inlet valves 50 are respectively controllable in dependence on an operating parameter of the internal combustion engine.

As can be seen from FIGS. 2a and 2b the piston 20 is provided with a frustoconical raised portion or dome 22 which forms a mixture or fresh air guide element and the shape of which is substantially adapted to the frustoconical shape of the combustion chamber 30. Provided in the center of the frustoconical raised portion 22 is a preferably part-spherical recess 24 in which the fresh air or the mixture to be fired can be collected, opposite the sparking plug 60 or the injection nozzle 60'. In addition, as can also be seen from FIGS. 2a and 2b, formed between an annular surface 26 of the piston 20 and the cylinder head surface 14 which is opposite the piston 20 when it reaches the top dead center position is a squeeze gap 90 which displaces the fresh air or the mixture which has accumulated at that location during the compression procedure, and accelerates it through the frustoconical raised portion 22 of the piston 20 in the direction of the sparking plug 60 or the injection nozzle 60'.

As the two inlet ducts 40 and the exhaust duct 70 are controlled by way of controllable regulating elements 50, 80 in dependence on an operating parameter of the internal combustion engine, it is possible to produce an asymmetrical control diagram, as can be seen from FIG. 3. In FIG. 3, 1 represents the working stroke of the piston, 2 represents the discharge flow of burnt gases, 3 represents the intake flow of fresh gases, 4 represents scavenging, 5 represents additional charging, and 6 represents the compression stroke of the piston.

As can be seen from FIG. 4, the fresh mixture can also be produced by means of injection of fuel into the fresh air which is supplied through the inlet ducts 40 by means of a blower (not shown). For that purpose, an injection valve 42a and 42b respectively is disposed in each of the inlet ducts 40. Instead of two inlet ducts 40 each having an injection valve 42a and 42b respectively, it is also possible to provide a single injection inlet duct 40 having a step injection nozzle (not shown). It is also possible to provide two injection valves 42a and 42b respectively in one inlet duct 40.

The mode of operation of the internal combustion engine according to the invention is described hereinafter:

In the first stroke the piston 20 is working, that is to say it moves from the top dead center position to the bottom dead center position. Before it reaches the bottom dead center position, the exhaust duct 70 is opened on the one hand by the piston 20 but also by the controllable regulating element 80. Shortly thereafter the inlet ducts 40 are opened by the two valves 50. The fresh air or the fresh mixture which is driven by a blower can pass by way of the inlet ducts 40 into the combustion chamber 30, the fresh mixture or the fresh air flowing with a circling motion along the wall of the cylinder 10. In the second stroke the piston 20 is moving from the bottom dead center position to the top dead center position. In this case the exhaust duct 70 is closed both by the valve element 80 and also by the piston 20. Then the inlet ducts 40 are also closed by the valves 50 and the fresh mixture or the fresh air is compressed. Shortly before the piston reaches the top dead center position the fresh mixture is fired by means of the sparking plug 60 or, when the two-stroke internal combustion engine is operating as a Diesel-burning internal combustion engine, fuel is injected. It is to be noted that the exhaust duct 70 can be opened or closed independently of the position of the piston 20, by means of the controllable regulating element 80, that is to say, the exhaust duct 70 is already closed or opened before the piston 20 has assumed a corresponding position in the cylinder 10.

A so-called charge layering effect or layered charge can also be achieved with the two-stroke internal combustion engine according to the invention. In that case the feed of the fresh mixture occurs through the two injection valves 42*a*, 42*b* in the two inlet ducts 40. When the piston 20 moves from the top dead center position to the bottom dead center position, little fuel is added to the fresh air from the first injection valve 42*a* so that a lean mixture is produced. In the additional charging region, that is to say when the piston 20 is moving from the bottom dead center position to the top dead center position, a great deal of fuel is added to the incoming flow of air, by the second injection valve 42*b*, thus resulting in a rich mixture. By virtue of the piston 20 being of a particular configuration, the rich mixture collects in the combustion chamber 24, which is of a part-spherical configuration, of the piston 20, where it is fired by the centrally arranged sparking plug.

Instead of two injection valves 42*a*, 42*b* in each respective inlet duct 40 or in the case of a single inlet duct 40, it is also possible to use a step injection valve. Likewise two injection valves can be provided in relation to a single inlet duct.

Finally it is also to be pointed out that the drive of the control elements or valves for the inlet and exhaust ducts can be adjusted electrohydraulically, whereby the control times can be adapted to the respective requirements involved.

FIG. 5 shows a working diagram for a five-cylinder two-stroke in-line engine. The engine has a selected firing order of cylinders 1, 4, 2, 5, and 3. In FIG. 5, the number 1 represents the compression stroke, 2 represents scavenging, 3 represents additional charging, and 4 represents compression. It can be directly seen from this working diagram that the internal combustion engine according to the invention not only has a high level of efficiency but it is also smooth in operation as the overlap of the individual working strokes is comparatively great.

What is claimed is:

1. A combustion chamber for a reciprocating-piston internal combustion engine having a cylinder (10) and a piston (20) which is reciprocal therein and at least one inlet duct (40) and at least one outlet duct (70), characterized in that the cylinder head (12) of the cylinder (10) and the piston (20) each have a respective annular squish surface (14, 26) for acceleration of the fresh gases, wherein the annular squish surface (26) of the piston (20) is followed by a frustoconical raised mixture guide element (22) which adjoins the piston crown and which is provided at the top with a centrally located recess (24), and that the inlet duct (40) is so arranged that the fresh gases flow with a circulatory movement into the combustion chamber.

2. A combustion chamber as set forth in claim 1 characterized in that the recess (24) is of a part-spherical configuration.

* * * * *